(12) United States Patent  (10) Patent No.: US 7,712,347 B2
Ricks et al.  (45) Date of Patent: May 11, 2010

(54) SELF DIAGNOSTIC MEASUREMENT METHOD TO DETECT MICROBRIDGE NULL DRIFT AND PERFORMANCE

(75) Inventors: Lamar F. Ricks, Lewis Center, OH (US); Paul P. Bey, Hilliard, OH (US)

(73) Assignee: Honeywell International Inc., Morristown, NJ (US)

( * ) Notice: Subject to any disclaimer, the term of this patent is extended or adjusted under 35 U.S.C. 154(b) by 254 days.

(21) Appl. No.: 11/897,058

(22) Filed: Aug. 29, 2007

(65) Prior Publication Data

US 2009/0056410 A1 Mar. 5, 2009

(51) Int. Cl.
    *G01F 25/00* (2006.01)
(52) U.S. Cl. ...................................... 73/1.34
(58) Field of Classification Search ............... 73/1.34
    See application file for complete search history.

(56) References Cited

U.S. PATENT DOCUMENTS

| | | | |
|---|---|---|---|
| 3,410,287 A | 11/1968 | Van Der Heyden et al. | 137/36 |
| 4,341,107 A | 7/1982 | Blair et al. | 73/3 |
| 5,000,478 A | 3/1991 | Kerastas | 280/707 |
| 5,050,429 A | 9/1991 | Nishimoto et al. | 73/204.26 |
| 5,076,099 A | 12/1991 | Hisanaga et al. | |
| 5,184,107 A | 2/1993 | Maurer | 338/42 |
| 5,410,916 A | 5/1995 | Cook | 73/706 |
| 5,631,417 A | 5/1997 | Harrington et al. | 73/204.26 |
| 5,735,267 A | 4/1998 | Tobia | 128/204.21 |
| 5,827,960 A | 10/1998 | Sultan et al. | 73/204.26 |
| 5,892,145 A | 4/1999 | Moon et al. | 73/118.2 |
| 6,181,574 B1 | 1/2001 | Loibl | 361/816 |
| 6,543,449 B1 | 4/2003 | Woodring et al. | 128/204.18 |
| 6,591,674 B2 | 7/2003 | Gehman et al. | 73/204.22 |
| 6,595,049 B1 | 7/2003 | Maginnis, Jr. et al. | 73/202.5 |

(Continued)

FOREIGN PATENT DOCUMENTS

EP  0574288 B1  6/1993

(Continued)

OTHER PUBLICATIONS

Design and Fabrication of Artificial Lateral Line Flow Sensors; Z. Fan, J. Chen, J. Zou, D. Bullen, C. Liu, F. Delcomyn; Journal of Micromechanics and Microengineering 12 (2002) 655-661.

(Continued)

*Primary Examiner*—Hezron Williams
*Assistant Examiner*—Alex Devito

(57) ABSTRACT

A self-diagnostic measurement method to detect microbridge null drift and performance. An ASIC can be designed to include a self-diagnostic feature that automatically occurs at start up or upon command in Normal Operation whereby the temperature compensated microbridge null can be measured in a state of very low thermal energy and allows for the tracking of microbridge null stability versus time. An Airflow Combi-Sensor ASIC (Heimdal) with its strategic partner ZMD can be developed and can be implemented in the form of a self-diagnostic feature that occurs when power is first applied to the ASIC or upon command. When the self-diagnostic is initiated, power is removed and after the electronics have settled, a small power can be applied to the microbridge to measure the bridge null with reduced sensitivity to flow due to self-heating.

18 Claims, 6 Drawing Sheets

U.S. PATENT DOCUMENTS

| | | | |
|---|---|---|---|
| 6,655,207 B1 | 12/2003 | Speldrich et al. | 73/202.5 |
| 6,681,623 B2 | 1/2004 | Bonne et al. | 73/202 |
| 6,681,625 B1 | 1/2004 | Berkcan et al. | 73/204.23 |
| 6,684,695 B1 | 2/2004 | Fralick et al. | 73/204.26 |
| 6,724,612 B2 | 4/2004 | Davis et al. | 361/328 |
| 6,725,731 B2 | 4/2004 | Wiklund et al. | 73/861.52 |
| 6,761,165 B2 | 7/2004 | Strickland, Jr. | 128/204.22 |
| 6,769,285 B2 | 8/2004 | Schneider et al. | 73/1.06 |
| 6,805,003 B2 | 10/2004 | Ueki et al. | 73/204.26 |
| 6,820,481 B1 | 11/2004 | Weber et al. | 73/204.26 |
| 6,867,602 B2 | 3/2005 | Davis et al. | 324/664 |
| 6,871,537 B1 | 3/2005 | Gehman et al. | 73/204.26 |
| 6,904,799 B2 | 6/2005 | Cohen et al. | 73/204.11 |
| 6,904,907 B2 | 6/2005 | Speldrich et al. | 128/200.23 |
| 6,911,894 B2 | 6/2005 | Bonne et al. | 338/25 |
| 6,912,918 B1 | 7/2005 | Lynnworth et al. | 73/861.26 |
| 6,929,031 B2 | 8/2005 | Ford et al. | 137/884 |
| 6,945,118 B2 | 9/2005 | Maitland, Jr. et al. | 73/754 |
| 6,958,565 B1 | 10/2005 | Liu | 310/313 R |
| 7,073,392 B2 | 7/2006 | Lull et al. | 73/861 |
| 7,107,835 B2 | 9/2006 | Korniyenko et al. | 73/204.22 |
| 2002/0166361 A1 | 11/2002 | Wantz et al. | 73/1.06 |
| 2003/0062045 A1 | 4/2003 | Woodring et al. | 128/204.18 |
| 2004/0026365 A1 | 2/2004 | Fuertsch et al. | 216/39 |
| 2004/0056765 A1 | 3/2004 | Anderson et al. | 340/522 |
| 2004/0250796 A1 | 12/2004 | Veinotte | 123/520 |
| 2005/0016534 A1 | 1/2005 | Ost | 128/204.18 |
| 2005/0022594 A1 | 2/2005 | Padmanabhan et al. | 73/204.26 |
| 2005/0087190 A1 | 4/2005 | Jafari et al. | 128/204.21 |
| 2005/0189343 A1 | 9/2005 | Griffin et al. | 219/494 |
| 2005/0204799 A1 | 9/2005 | Koch | 73/1.06 |
| 2006/0000273 A1 | 1/2006 | Keppner et al. | |
| 2006/0048568 A1 | 3/2006 | Korniyenko et al. | 73/204.22 |
| 2006/0059986 A1 | 3/2006 | Wildgen | 73/202.5 |
| 2006/0186529 A1 | 8/2006 | Shirasaka et al. | 257/690 |
| 2006/0208848 A1 | 9/2006 | Kawamoto et al. | 338/22 R |
| 2007/0116083 A1 | 5/2007 | Oda et al. | |

FOREIGN PATENT DOCUMENTS

| | | |
|---|---|---|
| JP | 2004-205376 A | 7/2004 |

OTHER PUBLICATIONS

US 7,021,135, 04/2006, Korniyenko et al. (withdrawn)

SELF DIAGNOSTIC MEASUREMENT METHOD TO DETECT MICROBRIDGE NULL DRIFT AND PERFORMANCE

TECHNICAL FIELD

Embodiments are generally related to sensing systems and methods. Embodiments are also related to the field of microbridge flow sensing and controlling methods and systems. Embodiments are additionally related to self-diagnostic measurement method to detect microbridge null drift and performance.

BACKGROUND OF THE INVENTION

Microbridge mass airflow sensors are manufactured using MEMS (Micro-Electro-Mechanical Systems) technology. The microstructure chip comprises of a thin-film, thermally isolated bridge structure containing a heater and temperature sensing elements, all spanning an etched cavity. Heater temperature is typically controlled to be several degrees above ambient temperature. Thermal flow sensors operate on the principles of heat transfer across the surface of the sensing element. The upstream sense resistors are cooled, the downstream sense resistors are heated, and the combined differential electrical signal is proportional to flow.

Microbridge sensors can be designed into safety critical applications. Sometimes in these applications the microbridge sensor can be utilized in a dynamic feedback loop and can be the only indication of flow in the entire system. In such instances, accuracy, repeatability and long term drift performance are all crucial factors. In safety critical applications, redundant sensors can be utilized and the outputs of each of the sensors may be averaged to minimize the effects of long term drift on accuracy performance. This can be an expensive solution and is also not completely fail safe.

If the output of the microbridge sensor can be measured at a known flow condition, then the end user can recalibrate (either electronically or via software) the output of the sensor and account for sensor drift. However, the most optimum condition to measure is zero flow. If the flow can be completely shut off in the system and the no flow null of the microbridge measures as direct measurement that can be made of long term drift. Often times it is either physically not possible or too expensive to shut off flow to the sensor or to put in a known flow condition.

One known trick that is performed and known in public domain is to shut of the heater to the microbridge, wait some amount of time that is predetermined, and then measure the bridge null. Usually the heater is turned on and off by the end user. A lot of thermal energy can be removed from the system when the heater is turned off.

In known prior art methods, attempt to measure bridge null drift makes only the microbridge heater to shut off. The action of reducing the supply voltage across the bridge and measuring the microbridge null only occurs when actively performed by the end user. The microbridge null will also be temperature compensated by the electronics within the sensor. When the heater is shut off and the microbridge null is measured, the value can change significantly depending on the specific temperature at which the measurement was taken.

Referring to FIG. 1, labeled as "prior art", a cross-sectional view of a Microbridge mass airflow sensor, which can be used for and benefit from features of the present invention is illustrated. The body of the sensor 100 is a semiconductor, preferably silicon substrate 101 with an etched cavity 102, chosen because of its adaptability to prediction etching techniques and ease of electronic chip productivity. The airflow can be from a direction indicated by an arrow 103. The upstream sense resistors 104 can be cooled by the transportation of heat away from the resistors 104 toward the heater 105. Transportation of heat toward the downstream sense resistors 106 from the heater 105 heats the downstream sense resistor 106. A resistance difference between the upstream sense resistors 104 and downstream sense resistors 106 can be present with a corresponding difference in voltage drop. The difference in voltage drop can be the measure of airflow.

Based on the foregoing, it is believed that a need exists for a microbridge sensor design that overcomes such problems. It is believed that the system and method disclosed herein offers a solution to these problems by providing an improved Airflow Combi-sensor ASIC (Heidmal) design which includes a self diagnostic method that automatically occurs at start up whereby the temperature compensated microbridge null drift and performance can be measured.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved microbridge sensing and controlling method and system.

It is another aspect of the present invention to provide for an improved measurement method to detect microbridge null drift and performance.

It is a further aspect of the present invention to provide for an improved Airflow Combi-sensor ASIC (Application Specific Integrated Circuits), which includes a self-diagnostic feature.

The aforementioned aspects and other objectives and advantages can now be achieved as described herein. An ASIC (Application Specific Integrated Circuits) can be designed to include a self diagnostic feature that automatically occurs at start up whereby the temperature compensated microbridge null is measured in a state of very low thermal energy and allows for the tracking of microbridge null stability versus time. The microbridge null can be measured even in the presence of flow if all is the thermal energy is completely removed from the system, which can be a very good indication of null stability. All sources of heat are to be removed to completely remove all thermal energy from the system. All electronics should be shut off. In order to measure the microbridge null, power can be applied to the bridge and therefore bias currents runs through the microbridge resistors, thus creating a thermal source. The microbridge null can be measured as soon as possible after power is applied so the resistors do not have time to generate much thermal energy.

An Airflow Combi-Sensor ASIC (Heimdal) with its strategic partner ZMD can be developed. The newly proposed IP can be incorporated into the Heimdal ASIC and can be implemented in the form of a self-diagnostic feature that occurs when power is first applied to the ASIC. At start-up, immediately after the electronics have settled, power will be applied to the microbridge and the very first action taken will be to measure the bridge null.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
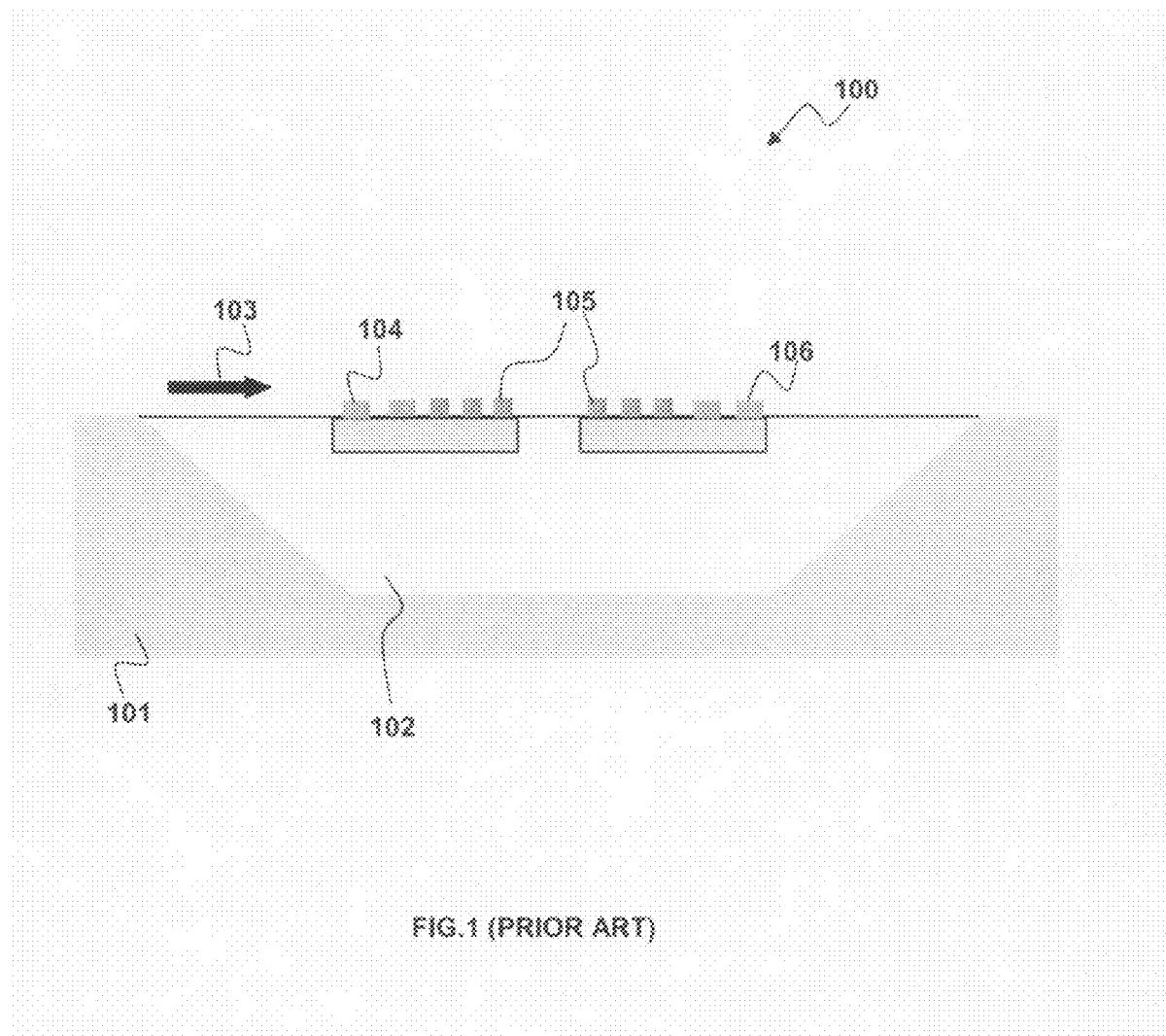
FIG. 1 labeled as "prior art", illustrates a cross-sectional view of a Microbridge mass airflow sensor, which can be used for and benefit from features of the present invention.
Figure 2:
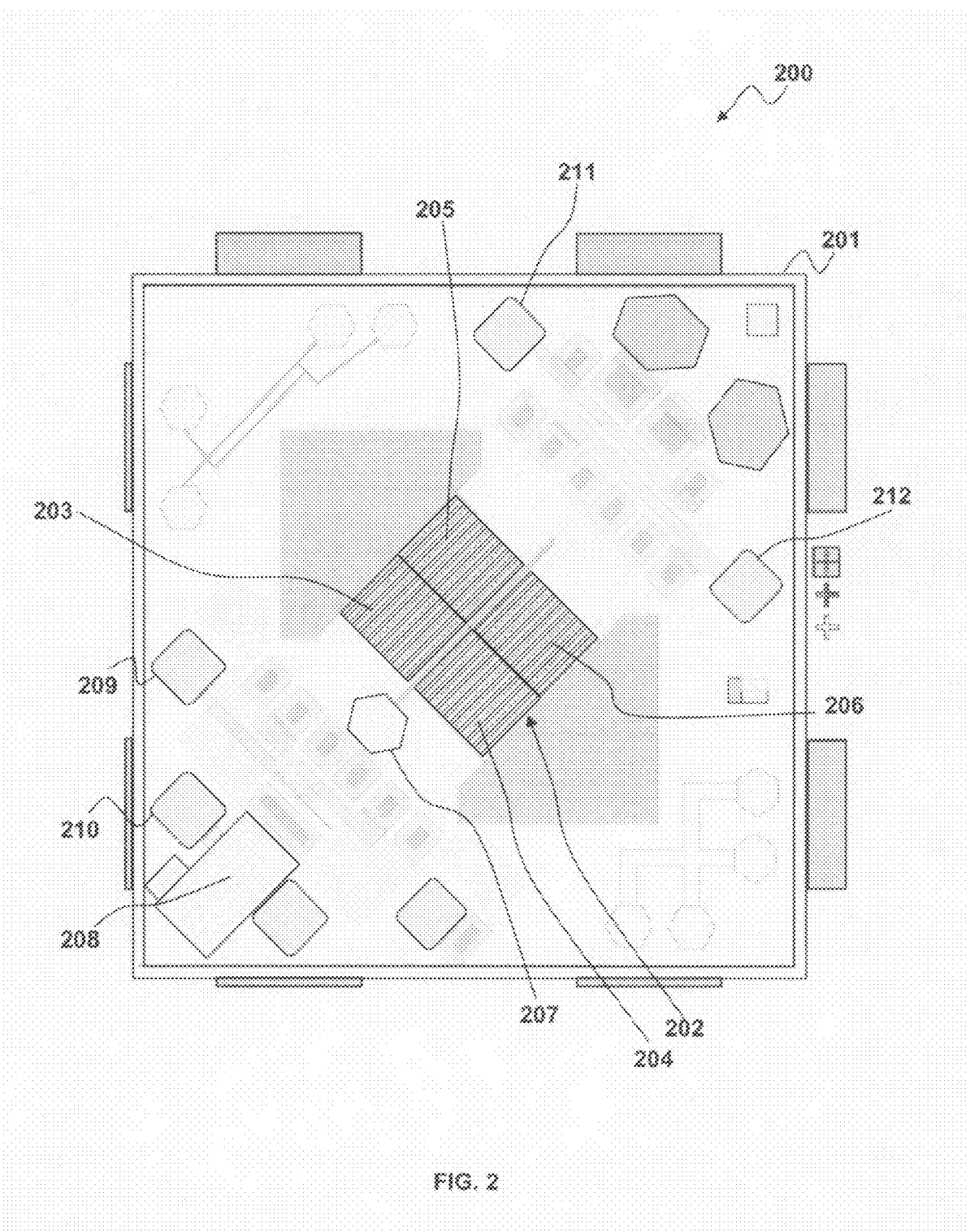
FIG. 2 illustrates a perspective view of a airflow die design, which can be implemented in accordance with a preferred embodiment.

Referring to FIG. 2, illustrated is a perspective view of an optimized airflow die design 200 in accordance with a preferred embodiment. The new airflow die design 200 yields a physical size of ~3X-4X. The design 200 instances an optimized transducer layout 201 leveraging extensive flow stimulation, prototyping and DOE's with a full Wheatstone Bridge 202. The Wheatstone bridge 202 includes temperature sensitive resistors RU1 203, RD1 204, RU2 205, and RD2 206. The bridge 202 structure further includes a heater element RH 207 and temperature sensing element RT 208. The ratiometric output signals 209 and 210 correspond to a difference in voltage across the Wheatstone bridge 202 circuit. The Wheatstone bridge 202 can be supplied with power at the points 211 and 212. The S/N ratio of standard production airflow die design 200 also has the same physical size. The Airflow die design 200 is built for ASIC compensation and requires no additional discrete electronics for compensation or calibration.

Figure 3:
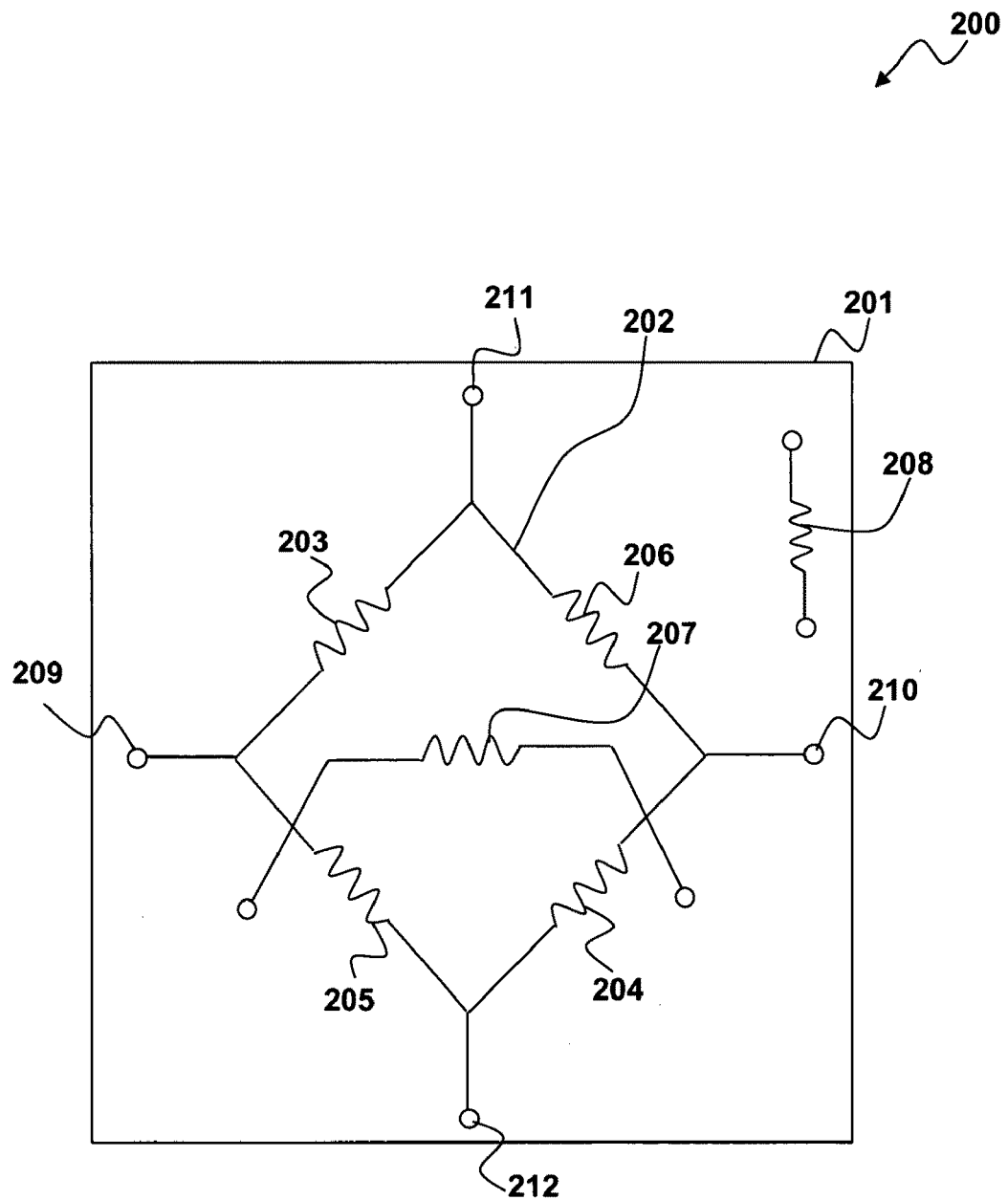
FIG. 3 illustrates a schematic view of the airflow die design, which can be implemented in accordance with a preferred embodiment.

Referring to FIG. 3, illustrated is a schematic view of an Airflow die design 200, which can be implemented in accordance with the preferred embodiment. The design 200 instances an optimized transducer layout 201. The Wheatstone bridge 202 includes temperature sensitive resistors RU1 203, RD1 204, RU2 205, and RD2 206. The bridge 202 structure further includes a center heater element RH 207 and temperature sensing element RT 208. The ratiometric output signals 209 and 210 correspond to the difference in voltage across the Wheatstone bridge circuit 202. The Wheatstone bridge 202 can be supplied with power at the points 211 and 212.

Figure 4:
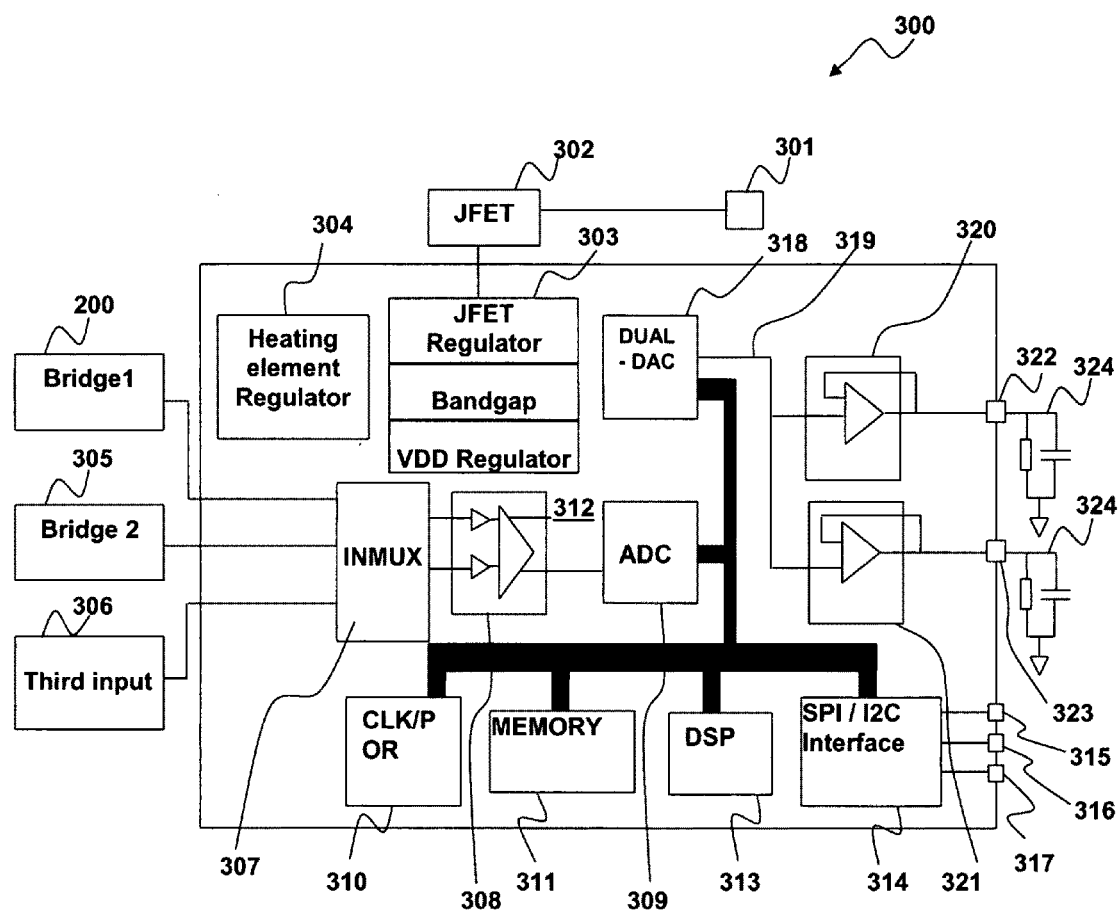
FIG. 4 illustrates a block diagram of a Heimdal Airflow ASIC, which can be implemented in accordance with a preferred embodiment.

Referring to FIG. 4, illustrated is a block diagram of a Heimdal Airflow ASIC 300, which can be implemented in accordance with a preferred embodiment. A supply power Vsupply 301 can be applied to the JFET 302, which can be regulated by a JFET regulator 303. The heating element regulator 304 regulates the heat-sensing element 207 and temperature sensing element 208 of the airflow sense design 200, as illustrated in FIG. 2. The outputs from the airflow die design 200, a second bridge 305 and a third input 306 can be applied to a 9:2 multiplexer INMUX 307. A preamplifier 308 can be used to amplify the output of the INMUX 307. The INMUX 307 output can be applied to ADC 309. The CLK/POR 310 gives signal to ADC 309, the memory 311 stores the output signal 312 and the digital signal processor DSP 313 processes the output signal 312. The SPI/I2C interface 314 can be used to interface ADC 309, CLK/POR 310, memory 311, DSP 313, and the Dual DAC 318. The SCLK 315, MISO 316, and SS 317 control the SPI interface 314. The SCL and SDA are the respective clock and data line for the I2C interface. The output signal 312 can then be applied to Dual DAC 318. The analog signal 319 can be given to output buffer1 320 and output buffer2 321 which can be a voltage follower. The output V01 322 and V02 323 can be measured across the load resistance 324; can be the microbridge null performance.

Figure 5:
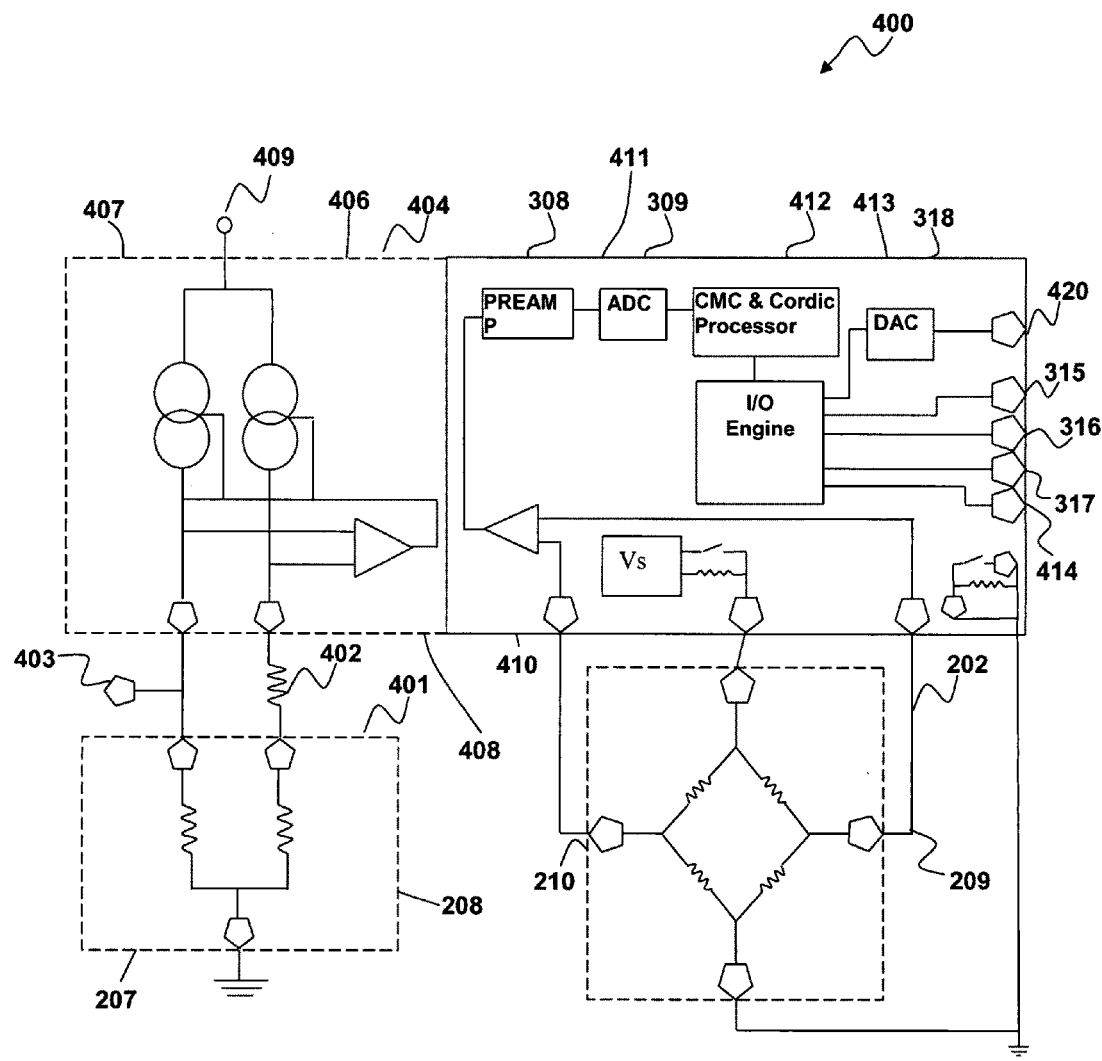
FIG. 5 illustrates a circuit diagram of Microbridge with discrete electronics, which can be implemented in accordance with a preferred embodiment.

Referring to FIG. 5, illustrated is a circuit diagram of a Microbridge 400 with discrete electronics, which can be implemented in accordance with a preferred embodiment. A thermally isolated bridge structure 401 comprises heater resistive element RH 207 and temperature sensing element RT 208. The heater temperature RTset 402 can be kept at a constant differential above ambient air temperature. Power as indicated at 403 can be applied to the bridge and therefore bias current continues running through the heater and temperature sensing elements 207 and 208. The Heimdal control circuit 404 includes two current sources 406 and 407 and a differential amplifier 408. An external supply 409 is provided to the heater control circuit 404. The output of the amplifier 408 is given as feed back to the current sources 406 and 407. The output electric signal 210 and 209 of the Wheatstone Bridge 202 is given to the differential gain amplifier 410 to provide a useful signal 411. The signal 411 can be pre-amplified by the preamplifier 308. An ADC 309 converts the differential analog signal to digital. The signal 411 can be further passed on to the CMC and cordic processor 412, which process the signal 412 and input to I/O engine 413. The SCL_SCLK serial clock 315, SDA_MISC 316, SPI-SS 317 are the digital calibrated flow output of the I/O engine 413. The Pulse width modulation pulse output 414 can also be provided by the I/O engine 413 for pulse width modulation of the processed signal 411. A DAC 318 converts the signal 413 to analog output for the calibrated flow signal 420. Note than in FIGS. 2-5, identical or similar parts or elements are generally indicated by identical reference numerals.

Figure 6:
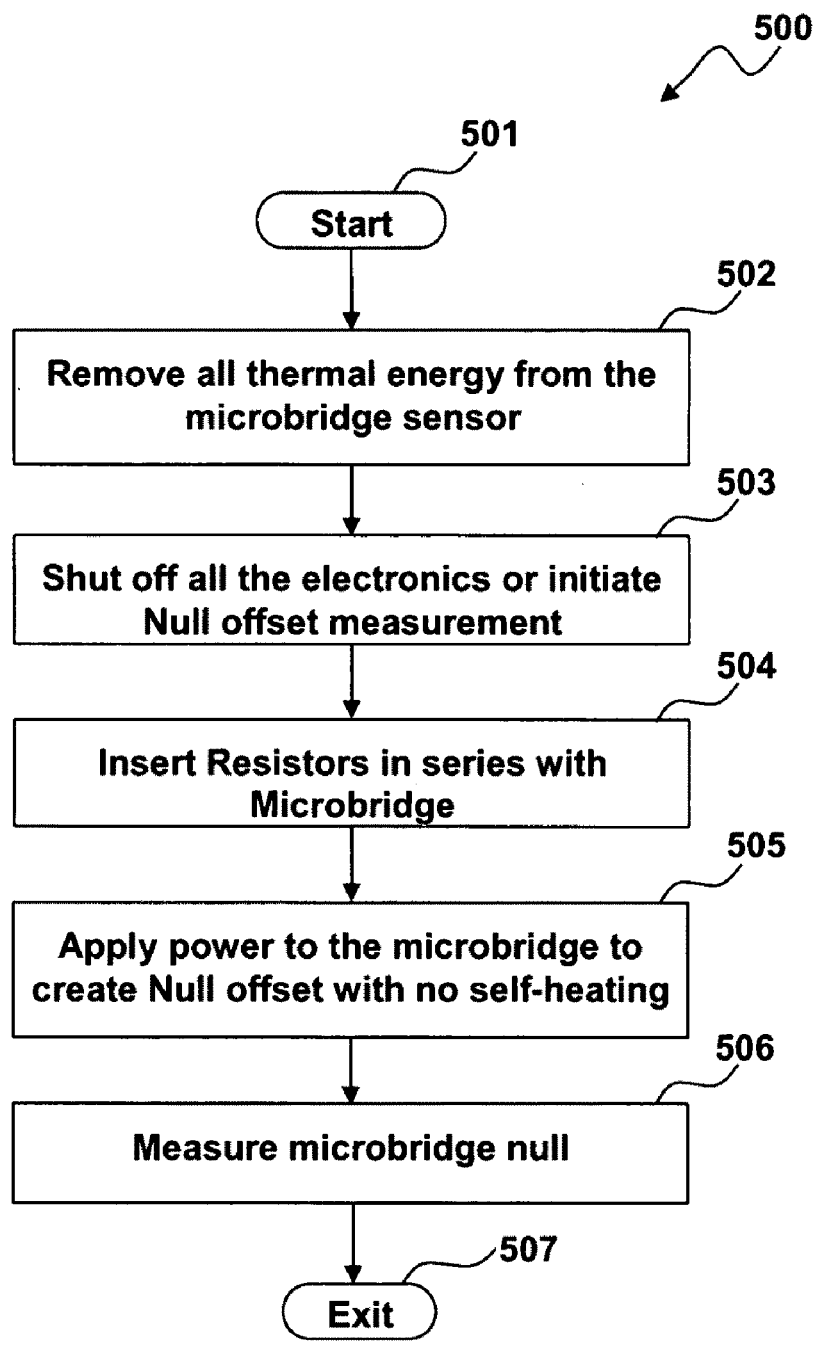
FIG. 6 illustrates a high-level flow chart of logical operational steps of a self-diagnostic measurement method to detect Microbridge null drift and performance, which can be implemented in accordance with an alternative embodiment.

Referring to FIG. 6, illustrated is a high-level flow chart of logical operational steps of a self-diagnostic measurement method 500 to detect Microbridge null drift and performance, which can be implemented in accordance with an alternative embodiment. The process can begin as indicated at block 501. Next, as depicted at block 502, all the thermal energy from the microbridge sensor should be removed. Thereafter, as indicated at block 503, all the electronics to the system can be shut off. Next, as described at block 504, a small voltage can be applied to the microbridge to create a null voltage with a minimal thermal energy source. Thereafter, as depicted at block 505, the microbridge null can be measured. The process can then be terminated as indicated at block 506.

The ASIC flow die new electronics can be advantageous over old electronics related to null performance. The Tco (temperature coefficient of offset correction) performance can be superior because all of the resistors in the microbridge have tight TCR (temperature coefficient of resistance) matching. Superior accuracy can be due to increased S/N (signal to noise) ratio and improved compensation algorithms. Much less power can be generated in the heater. That means only less time is taken to dissipate the thermal energy when the heater is shut off.

The potential advantage of new microbridge electronics is the use of interdigitated sense resistors in the microbridge. This is one of the reasons why new electronics delivers much higher sensitivity versus flow. However, if the heater is turned off, the remaining bridge signal can be larger than in the previous microbridge signal in the presence of flow. If the bridge supply can be completely removed, more time would be taken to dissipate the thermal energy, but the time required would be significantly less than the time required to dissipate the thermal energy in the previous microbridge heater.

The two ways to measure the microbridge null offset and determine if the null is drifting can be stated as follows. The microbridge must be in a known flow condition (preferably no flow). All the thermal energy can be completely removed from the sensing system by shutting off heater and removing supply voltage from the microbridge to eliminate bias current in the microbridge resistors. The designing in of a proprietary self diagnostic feature into the ASIC that would allow for self measuring and tracking of bridge null requires the user to cycle power to the ASIC.

Airflow signal and no-flow bridge null from self diagnostic measurement can be the two analog ratiometric output signals in the ASIC. For example, in ECC's pre-mix boiler application, it can be evident that by law the appliance can only be allowed to run in an "unsafe mode" for ~90 seconds. In order to ensure the airflow sensor can operate in a safe mode, the "No flow" Bridge null from the self diagnostic measurement can be monitored by ECC's controller and once null exceeds a predetermined threshold, a fault code would be set.

The power supply can be cycled to the sensor to initiate the self diagnostic measurement. Sufficient time>16 ms second can be allowed between the time the power can be removed from the sensor and can be reapplied to ensure most of the thermal energy has been removed from the system if the thermal energy has been minimized, then the self diagnostic null measurement made at start-up can be very close to the "No Flow" bridge null even in the presence of a small flow.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method to detect microbridge null performance in a microbridge sensor, the microbridge sensor including a heater element and a microbridge including a plurality of temperature sensitive resistors, the method comprising:
   not applying power to the heater element and the microbridge;
   waiting a time period without applying power to the heater element and the microbridge;
   applying diagnostic power to the microbridge after the waiting step at a diagnostic power level that is reduced relative to an operational power level, resulting in a reduced bias current in the plurality of temperature sensitive resistors relative to when the operational power level is applied;
   measuring a microbridge null offset voltage while the reduced bias current is being applied to the plurality of temperature sensitive resistors of the microbridge; and
   applying operational power to the microbridge at the operational power level, resulting in an increased bias current in the plurality of temperature sensitive resistors relative to when the diagnostic power level was applied.

2. The method of claim 1 wherein the microbridge sensor includes a controller configured to execute the steps of claim 1 in a start-up mode and/or upon command in a self diagnostic mode.

3. The method of claim 2 wherein the self diagnostic mode is transparent to an end user.

4. The method of claim 2, wherein the microbridge sensor includes a temperature sensor, and wherein said controller is configured to provide dynamic temperature compensation of said microbridge null offset by using calibration coefficients.

5. The method of claim 2 wherein said controller is configured to microbridge null offset over time.

6. A method to detect microbridge null offset in an ASIC, the ASIC including a heater element, a microbridge including a plurality of temperature sensitive resistors, and a controller configured to execute the self diagnostic measurement method, the method comprising:
   removing power from the heater element and the microbridge;
   waiting a time period without applying power to help dissipate thermal energy that was generated by power previously applied to the heater element and the microbridge;
   applying diagnostic power to the microbridge after the waiting step at a diagnostic power level that is reduced relative to an operational power level, resulting in a reduced bias current in the plurality of temperature sensitive resistors relative to when the operation power level is applied;
   measuring a microbridge null offset voltage while the reduced bias current is being applied to the plurality of temperature sensitive resistors of the microbridge; and
   applying operational power to the microbridge at the operational power level, resulting in an increased bias current in the plurality of temperature sensitive resistors relative to when the diagnostic power level was applied.

7. The method of claim 6 wherein the controller is configured to execute the steps of claim 1 in a start-up mode and/or upon command in a self diagnostic mode.

8. The method of claim 6 wherein said method is transparent to an end user.

9. The method of claim 6 wherein the ASIC includes a temperature sensor and the ASIC is configured to provide dynamic temperature compensation of said microbridge null offset by using one or more calibration coefficients.

10. The method of claim 6 wherein said ASIC is configured to track microbridge null offset over time.

11. A mass airflow sensor ASIC, the ASIC comprising:
   a heater element;
   a microbridge including a plurality of temperature sensitive resistors; and
   a controller programmed to:
      withhold power from the heating element and microbridge;
      wait a time period while withholding power from the heating element and microbridge;
      apply diagnostic power to the microbridge at a diagnostic power level that is reduced relative to an operational power level, resulting in a reduced bias current in the plurality of temperature sensitive resistors relative to when the operation power level is applied;

measure a microbridge null offset voltage while the reduced bias currents propagate through the plurality of temperature sensitive resistors of the microbridge; and apply operational power to the microbridge at the operational power level, resulting in an increased bias current in the plurality of temperature sensitive resistors relative to when the diagnostic power level was applied.

12. The ASIC of claim 11 wherein the controller is configured to withhold power, wait, apply diagnostic power, measure a microbridge null offset voltage and apply operation power at start-up and/or upon command.

13. The ASIC of claim 11 wherein said microbridge null offset voltage measurement is transparent to an end user.

14. The ASIC of claim 11 further comprising a temperature sensor, wherein said controller is configured to provide dynamic temperature compensation of said microbridge null offset voltage by using one or more calibration coefficients.

15. The ASIC of claim 11 wherein said controller is configured to track microbridge null offset over time.

16. The method of claim 1, wherein the waiting step waits is at least 16 ms.

17. The method of claim 1, further comprising setting a fault code if the microbridge null offset voltage exceeds a predetermined threshold.

18. The method of claim 1, wherein the microbridge sensor is a mass airflow sensor.

* * * * *